(12) United States Patent
Weaver et al.

(10) Patent No.: US 7,174,960 B2
(45) Date of Patent: Feb. 13, 2007

(54) METHOD TO DEPOLYMERIZE AS WELL AS DERIVATIZE A POLYSACCHARIDE IN A HYDROCARBON SLURRY

(75) Inventors: Jimmie D. Weaver, Duncan, OK (US); Michael A. McCabe, Duncan, OK (US); Billy Slabaugh, Duncan, OK (US); Mark Parker, Duncan, OK (US); Harold Walters, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 194 days.

(21) Appl. No.: 10/793,705

(22) Filed: Mar. 5, 2004

(65) Prior Publication Data

US 2005/0194138 A1 Sep. 8, 2005

(51) Int. Cl.
*E21B 33/138* (2006.01)
(52) U.S. Cl. ..................... 166/279; 166/300
(58) Field of Classification Search ............... None
See application file for complete search history.

(56) References Cited

U.S. PATENT DOCUMENTS

| | | | | |
|---|---|---|---|---|
| 5,447,199 A | * | 9/1995 | Dawson et al. | 166/300 |
| 6,387,853 B1 | | 5/2002 | Dawson et al. | 507/211 |
| 6,763,888 B1 | * | 7/2004 | Harris et al. | 166/305.1 |

FOREIGN PATENT DOCUMENTS

| | | |
|---|---|---|
| EP | 0465 992 A1 | 1/1992 |
| FR | 2 802 932 A | 6/2001 |
| JP | 06009701 | 1/1994 |
| WO | WO 03/001030 A1 | 1/2003 |

OTHER PUBLICATIONS

Foreign communication from related counterpart application dated May 7, 2005.

* cited by examiner

*Primary Examiner*—Zakiya W. Bates
(74) *Attorney, Agent, or Firm*—Robert A. Kent; Baker Botts

(57) ABSTRACT

Methods for preparing slurries that include depolymerized polysacoharides and depolymerized and derivatized polysaccharides that may be useful in subterranean well operations including fracturing, gravel packing, and frac-packing, are provided. One embodiment provides a method for making a slurry, comprising combining a polysaccharide with an organic solvent to form a slurry; and, depolymerizing the polysaccharide in the slurry. Another embodiment provides a method of treating subterranean formation with slurry comprising the steps of creating a slurry using a method comprising the steps of combining a polysacchande with an organic solvent to form a slurry; and, depolymerizing the polysaccharide in the slurry; and, placing that slurry into a subterranean formation.

62 Claims, No Drawings

METHOD TO DEPOLYMERIZE AS WELL AS DERIVATIZE A POLYSACCHARIDE IN A HYDROCARBON SLURRY

BACKGROUND OF THE INVENTION

This invention relates to methods for preparing slurries that include depolymerized polysaccharides and depolymerized and derivatized polysaccharides that may be useful in subterranean well operations including fracturing, gravel packing, and frac-packing.

Viscous fluids are added to subterranean formations (such as oil or gas wells), inter alia, to increase their permeability and production. It is believed that these viscous fluids do this by promoting or expanding cracks or "fractures" within the formation. These viscous fluids are called "fracturing fluids," and may be employed at various times during the life cycle of a production well. Most typically, they are introduced into completed wells penetrating oil or gas-containing formations. They are also used in secondary or tertiary recovery operations to facilitate the injection of other fluids.

Fracturing fluids may be aqueous, or employ organic solvents. These organic solvents include any material useful to form a polymer slurry. Diesel fuel, kerosene, mixed aliphatic oils, alcohols, and alkanes are all known as solvents for these slurries.

Fracturing fluids typically contain a gelling agent such as a polysaccharide. One such polysaccharide known in the art is guar. Guar is typically obtained as a powder, with a mesh size of about 60 to about 400. Native guar has a molecular weight of about 3,000,000. To prepare fracturing fluids, the guar may be "depolymerized," i.e., broken down into smaller polymer units, having a molecular weight of about 25,000 to about 400,000. This depolymerization is typically carried out before preparation of the fracturing fluid.

For example, guar may be depolymerized by adding guar to a reactor vessel together with a quantity of hydrogen peroxide and water. The reactor vessel is heated to initiate the reaction, which, once it commences, is exothermic. The reactor vessel is maintained at about 100° F. to about 200° F. for a time sufficient for the polymer to degrade to a desired molecular weight. The depolymerized guar may then be added to either an aqueous or organic solvent and may be used in, for example, a fracturing fluid.

Guar can also be "derivatized" by reaction with a variety of chemicals to incorporate desired functionality or capabilities to the guar polymer. Guar may be derivatized before preparation of the fracturing fluid slurry, or the derivatizing agents may be added directly to the slurry to prepare the derivatized guar. Examples of derivatized guars useful in fracturing fluids include carboxymethylguar, carboxymethylhydroxypropylguar, hydroxypropylguar, hydroxyethylguar, carboxymethylhydroxyethylguar, and hydroxybutylguar. Chemical reagents that are known for use in derivatizing guar include alkylene oxides, haloacetic acids such as chloroacetic acid, alkali metal haloacetates, including sodium chloroacetate and sodium bromoacetate. Alkylene oxides yield hydroxyalkyl guar derivatives, while acetate agents produce carboxymethylated guar derivatives. For example, propylene oxide is used to produce hydroxypropyl guar; while chloroacetic acid or sodium bromoacetate may be used to produce carboxymethyl guar. Carboxymethylhydroxypropyl guar may be produced by sequential reaction of guar with propylene oxide and chloroacetic acid.

In addition to the polymer gel, other materials may be added to fracturing fluids to enhance their performance. They may be formulated with viscosifiers, such as organophilic clays. They may also include one or more dispersants, to aid in dispersing or wetting. Surfactants useful for that purpose include alkyl sulfonates, alkyl aryl sulfonates, alkyl ammonium salts, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, and trialkyl benzylammonium chloride, and mixtures thereof.

SUMMARY OF THE INVENTION

This invention relates to methods for preparing slurries that include depolymerized polysaccharides and depolymerized and derivatized polysaccharides that may be useful in subterranean well operations including fracturing, gravel packing, and frac-packing.

One embodiment of the present invention provides a method for making a slurry, comprising combining a polysaccharide with an organic solvent to form a slurry; and, depolymerizing the polysaccharide in the slurry.

Another embodiment of the present invention provides a method of treating subterranean formation with slurry comprising the steps of creating a slurry using a method comprising the steps of combining a polysaccharide with an organic solvent to form a slurry; and, depolymerizing the polysaccharide in the slurry; and, placing that slurry into a subterranean formation.

The objects, features, and advantages of the present invention will be readily apparent to those skilled in the art upon a reading of the description of preferred embodiments that follows.

DESCRIPTION OF PREFERRED EMBODIMENTS

This invention relates to methods for preparing slurries that include depolymerized polysaccharides and depolymerized and derivatized polysaccharides that may be useful in subterranean well operations including fracturing, gravel packing, and frac-packing.

Some embodiments of the present invention provide methods of depolymerizing polysaccharides in a hydrocarbon solvent base to create a depolymerized polymer slurry. Other embodiments of the present invention provide methods of depolyermizing and derivatizing a polysaccharide in a hydrocarbon solvent base to create a depolymerized and derivatized polymer slurry. In embodiments wherein the polysaccharide is both depolymerized and derivatized, the depolymerization reaction may proceed, follow, or substantially coincide with the derivatization reaction.

One component of the slurries of the present invention is a gelling agent, preferably a polysaccharide such as guar, cellulose, locust bean gum, starch, etc. A preferred polysaccharide is guar, which may be used in any form but is preferably used as a powder having a U.S. mesh size from about 100 to about 325.

It is often useful to mix the polysaccharide with a solvent to facilitate depolymerization. While a variety of organic solvents may be employed in this invention, including diesel fuel, kerosene, and other hydrocarbons, the preferred organic solvents are polar. Examples of solvents that are especially suited for this invention are glycol ethers, polycarbonates, TMEDA, and furans, such as tetrahydrofuran. The most preferred concentration of polysaccharide is one that provides about 10% to about 60% by weight as a fraction of the weight of the final slurry. After it is combined with the solvent, the polysaccharide is "depolymerized," i.e., it is broken down into polymer units having a lower molecular weight. Typically, native guar has a molecular weight of about 3,000,000. In certain embodiments, it is desirable that the polysaccharide in the final slurry have a molecular weight in the range of about 100,000 to about 350,000.

Polysaccharides, such as guar, may be depolymerized by any means known in the art, including radiation, addition of an acid, or addition of an oxidizer. In some embodiments of the present invention, a polysaccharide may be depolymerized by adding a peroxide to a mixture of the polysaccharide in a solvent. This peroxide may be hydrogen peroxide, an organic peroxide (such as t-butyl peroxide), or combinations thereof. In embodiments wherein a peroxide is used to accomplish depolymerization, water must also be added to the mixture at the rate of about one mole of water for each mole of polysaccharide cleaved. Thus, to reduce a polysaccharide having a molecular weight of about 3,000,000 to polymers of about 200,000 molecular weight, one would need to add about 15 moles of water for each mole of polysaccharide. In certain preferred embodiments, it may be desirable to include a slight stoichiometric excess of water. One of ordinary skill in the art, with the benefit of this disclosure, will recognize the appropriate concentration of water to include for a given application. In some embodiments of the present invention, it may also be useful to heat the mixture of polysaccharide being depolymerized. Such heating may be useful to initiate the depolymerization. Once the depolymerization reaction begins, it is exothermic and the mixture should be maintained at a temperature from about 100° to about 200° F. for a time sufficient to complete the reaction. Typically, that time is from about 30 minutes to about 8 hours.

In addition to depolymerizing a polysaccharide in a solvent, the polysaccharide also may be derivatized. The derivatization of the polysaccharide may be conducted before depolymerization, after depolymerization, or at substantially the same time. The derivatized polysaccharides that may be prepared in this invention include hydroxyalkyl or carboxymethyl polysaccharides, or polysaccharides derivatized with both moieties. Some examples of derivatized guars include carboxymethylguar, carboxymethylhydroxypropylguar, hydroxypropylguar, hydroxyethylguar, carboxymethylhydroxyethylguar, and hydroxybutylguar, and mixtures thereof.

To derivatize a polysaccharide according to the methods of the present invention, a derivatizing agent is added to a polysaccharide/solvent mixture. Compounds that may be used as derivatizing agents in conjunction with the present invention include those that are known for use in derivatizing polysaccharides and include, but are not limited to, alkylene oxides, haloacetic acids such as chloroacetic acid, alkali metal haloacetates, including sodium chloroacetate and sodium bromoacetate. Alkylene oxides yield hydroxyalkyl guar derivatives, while acetate agents produce carboxymethylated guar derivatives. For example, propylene oxide is used to produce hydroxypropyl guar; while chloroacetic acid or sodium bromoacetate may be used to produce carboxymethyl guar. Carboxymethylhydroxypropyl guar may be produced by sequential reaction of guar with propylene oxide and chloroacetic acid. Generally, the derivatizing agent is added in an amount of between about 2% and about 50% of the weight of polysaccharide. In some preferred embodiments the derivatizing agent may be added in an amount of between about 6% and about 30% of the weight of polysaccharide. In still other preferred embodiments the derivatizing agent may be added in an amount of between about 10% and about 20% of the weight of polysaccharide.

In some embodiments of the present invention, a pH-adjusting agent may be added to the solvent. In many derivatizing and depolymerizing reactions, an alkaline environment is preferred as it may act, inter alia, to swell the polysaccharide particles and activate the derivatizing moieties on the polysaccharide (e.g., by forming alkoxide anions from alcoholic sites). It is within the ability of one skilled in the art, with the benefit of this disclosure, to determine whether and how much of a pH-adjusting agent may be helpful. Once the derivatizing and/or the depolymerizing reactions are complete, the pH of the product may be adjusted through the addition of a pH-adjusting agent. The pH should be adjusted to a range of about 4 to about 10 (in certain embodiments, from about 6 to about 8.5) for the slurry to best function as a fracturing fluid.

When the derivatizing agent is combined with the polysaccharide and solvent, it is advantageous to heat the resulting mixture, preferably between about 130° F. and about 160° F. The resulting mixture may be stirred or agitated to assist the reaction. In most applications, a reaction time of about 30 minutes to about 8 hours should be sufficient.

The size, shape, and configuration of the reaction vessel is not critical to the depolymerization or derivatization of the polysaccharide. In some preferred embodiments, it may be desirable to stir or agitate the reaction mixture. Typically, the reaction is preformed in a substantially inert or substantially carbon dioxide-free and substantially non-oxidizing (e.g. oxygen free) atmosphere to prevent polymer oxidation and/or degradation. While nitrogen is the most preferred inert gas for this purpose, other inert gases such as argon or helium also may be suitable.

A variety of materials may be added to the slurry to enhance its stability and utility. Viscosifiers, such as organophilic clays, are desirable additives, as are dispersants. Suitable dispersants for this invention include alkyl sulfonates, alkyl aryl sulfonates, alkyl ammonium salts, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, and trialkyl benzylammonium chloride, and mixtures thereof. One of ordinary skill in the art with the benefit of this disclosure will recognize when such additives are appropriate.

Once the reaction is complete and the slurry is prepared, it may be used immediately, or stored until it is ready for use.

The slurries of this invention may be used in, for example, drill-in, drilling, completion, cementing, stimulation, workover, and remedial operations. Specific examples of treatment fluids that can be prepared from these slurries include drilling muds, lost circulation compositions, drill in fluids, gravel pack fluids, frac pack fluids, gel cleanout fluids, blocking gels, gelled acid fluids, gel pills for fluid loss control, and foamed fluids. The use of these slurries for those applications is within the competence of those skilled in the art.

Thus, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method for making a slurry, comprising:
combining a polysaccharide with an organic solvent to form a slurry, wherein the organic solvent further comprises a viscosifier; and,
depolymerizing the polysaccharide in the slurry.

2. The method of claim 1 further comprising the step of derivatizing the polysaccharide in the slurry.

3. The method of claim 2 wherein the step of derivatizing the polysaccharide in the slurry occurs before the step of depolymerizing the polysaccharide in the slurry.

4. The method of claim 2 wherein the step of derivatizing the polysaccharide in the slurry occurs after the step of depolymerizing the polysaccharide in the slurry.

5. The method of claim 2 wherein the step of derivatizing the polysaccharide in the slurry occurs substantially simultaneously with the step of depolymerizing the polysaccharide in the slurry.

6. The method of claim 2 wherein the polysaccharide is derivatized with a derivatizing agent selected from the group consisting of alkylene oxides, haloacetic acids, alkali metal haloacetates, and mixtures thereof.

7. The method of claim 1 wherein the step of depolymerizing said polysaccharide comprises the addition of a peroxide to said organic solvent.

8. The method of claim 7 wherein the peroxide comprises hydrogen peroxide, an organic peroxide, or combinations thereof.

9. The method of claim 1 wherein the viscosifier comprises an organophilic clay.

10. The method of claim 1 wherein the organic solvent further comprises a dispersant.

11. The method of claim 10, wherein the dispersant is selected from the group consisting of alkyl sulfonates, alkyl aryl sulfonates, alkyl ammonium salts, alkyl trimethylammonium chlorides, branched alkyl ethoxylated alcohols, phenol-formaldehyde nonionic resin blends, cocobetaines, dioctyl sodium sulfosuccinates, imidazolines, alpha olefin sulfonates, linear alkyl ethoxylated alcohols, trialkyl benzylammonium chlorides, and mixtures thereof.

12. The method of claim 1 further comprising the step of adding particulates to the slurry after the step of depolymerizing the polysaccharide in the slurry.

13. A method of treating subterranean formation with slurry comprising the steps of
creating a slurry using a method comprising the steps of:
combining a polysaccharide with an organic solvent to form a slurry; and,
depolymerizing the polysaccharide in the slurry; and,
placing that slurry into a subterranean formation.

14. The method of claim 13 further comprising the step of, while creating the slurry, derivatizing the polysaccharide in the slurry.

15. The method of claim 14 wherein the step of derivatizing the polysaccharide in the slurry occurs before the step of depolymerizing the polysaccharide in the slurry.

16. The method of claim 14 wherein the step of derivatizing the polysaccharide in the slurry occurs after the step of depolymerizing the polysaccharide in the slurry.

17. The method of claim 14 wherein the step of derivatizing the polysaccharide in the slurry occurs substantially simultaneously with the step of depolymerizing the polysaccharide in the slurry.

18. The method of claim 14 wherein the polysaccharide is derivatized with a derivatizing agent is selected from the group consisting of alkylene oxides, haloacetic acids, alkali metal haloacetates, and mixtures thereof.

19. The method of claim 13 wherein the step of depolymerizing said polysaccharide, while creating the slurry, comprises the addition of a peroxide to said organic solvent.

20. The method of claim 19 wherein the peroxide comprises hydrogen peroxide, an organic peroxide, or combinations thereof.

21. The method of claim 13 wherein the organic solvent used in creating the slurry further comprises a viscosifier.

22. The method of claim 21 wherein the viscosifier comprises an organophilic clay.

23. The method of claim 13 wherein the organic solvent used in creating the slurry further comprises a dispersant.

24. The method of claim 23, wherein the dispersant is selected from the group consisting of alkyl sulfonates, alkyl aryl sulfonates, alkyl ammonium salts, alkyl trimethylammonium chlorides, branched alkyl ethoxylated alcohols, phenol-formaldehyde nonionic resin blends, cocobetaines, dioctyl sodium sulfosuccinates, imidazolines, alpha olefin sulfonates, linear alkyl ethoxylated alcohols, trialkyl benzylammonium chlorides, and mixtures thereof.

25. The method of claim 13 further comprising the step of adding particulates to the slurry after the step of depolymerizing the polysaccharide in the slurry.

26. A method of control fluid loss into a subterranean formation from a well bore comprising the steps of
creating a gel using a method comprising the steps of:
combining a polysaccharide with an organic solvent to form a slurry; and,
depolymerizing the polysaccharide in the slurry; and,
placing that gel into a subterranean formation such that it acts to prevent fluids introduced to the well bore from leaving the well bore and entering the formation.

27. The method of claim 26 further comprising the step of, while creating the slurry, derivatizing the polysaccharide in the slurry.

28. The method of claim 27 wherein the step of derivatizing the polysaccharide in the slurry occurs before the step of depolymerizing the polysaccharide in the sluny.

29. The method of claim 27 wherein the step of derivatizing the polysaccharide in the slurry occurs after the step of depolymerizing the polysaccharide in the slurry.

30. The method of claim 27 wherein the step of derivatizing the polysaccharide in the slurry occurs substantially simultaneously with the step of depolymerizing the polysaccharide in the slurry.

31. The method of claim 27 wherein the polysaccharide is derivatized with a derivatizing agent selected from the group consisting of alkylene oxides, haloacetic acids, alkali metal haloacetates, and mixtures thereof.

32. The method of claim 26 wherein the step of depolymerizing said polysacchande, while creating the slurry, comprises the addition of a peroxide to said organic solvent.

33. The method of claim 32 wherein the peroxide is selected from the group consisting of hydrogen peroxide, an organic peroxide, or combinations thereof.

34. The method of claim 26 wherein the organic solvent used in creating the slurry further comprises a viscosifier.

35. The method of claim 34 wherein the viscosifier comprises an organophilic clay.

36. The method of claim 26 wherein the organic solvent used in creating the slurry further comprises a dispersant.

37. The method of claim 36, wherein the dispersant is selected from the group consisting of alkyl sulfonates, alkyl aryl sulfonates, alkyl ammonium salts, alkyl trimethylammonium chlorides, branched alkyl ethoxylated alcohols, phenol-formaldehyde nonionic resin blends, cocobetaines, dioctyl sodium sulfosuccinates, imidazolines, alpha olefin sulfonates, linear alkyl ethoxylated alcohols, trialkyl benzylammonium chlorides, and mixtures thereof.

38. The method of claim 26 further comprising the step of adding particulates to the slurry after the step of depolymerizing the polysaccharide in the slurry.

39. A method for making a slurry, comprising:
   combining a polysaccharide with an organic solvent to form a slurry, wherein the organic solvent further comprises a dispersant; and,
   depolymerizing the polysaccharide in the slurry.

40. The method of claim 39, wherein the dispersant is selected from the group consisting of alkyl sulfonates, alkyl aryl sulfonates, alkyl ammonium salts, alkyl trimethylammonium chlorides, branched alkyl ethoxylated alcohols, phenol-formaldehyde nonionic resin blends, cocobetaines, dioctyl sodium sulfosuccinates, imidazolines, alpha olefin sulfonates, linear alkyl ethoxylated alcohols, trialkyl benzylammonium chlorides, and mixtures thereof.

41. The method of claim 39 further comprising the step of adding particulates to the slurry after the step of depolymerizing the polysaccharide in the slurry.

42. The method of claim 39 wherein the organic solvent further comprises a viscosifier.

43. The method of claim 42 wherein the viscosifier comprises an organophilic clay.

44. The method of claim 39 further comprising the step of derivatizing the polysaccharide in the slurry.

45. The method of claim 44 wherein the step of derivatizing the polysaccharide in the slurry occurs before the step of depolymerizing the polysaccharide in the slurry.

46. The method of claim 44 wherein the step of derivatizing the polysaccharide in the slurry occurs after the step of depolymerizing the polysaccharide in the slurry.

47. The method of claim 44 wherein the step of derivatizing the polysacchande in the slurry occurs substantially simultaneously with the step of depolymerizing the polysaccharide in the slurry.

48. The method of claim 44 wherein the polysaccharide is derivatized with a derivatizing agent selected from the group consisting of alkylene oxides, haloacetic acids, alkali metal haloacetates, and mixtures thereof.

49. The method of claim 39 wherein the step of depolymerizing said polysaccharide comprises the addition of a peroxide to said organic solvent.

50. The method of claim 49 wherein the peroxide comprises hydrogen peroxide, an organic peroxide, or combinations thereof.

51. A method for making a slurry, comprising:
   combining a polysaccharide with an organic solvent to form a slurry;
   depolymerizing the polysaccharide in the slurry; and,
   adding particulates to the slurry.

52. The method of claim 51 wherein the organic solvent further comprises a dispersant.

53. The method of claim 52, wherein the dispersant is selected from the group consisting of alkyl sulfonates, alkyl aryl sulfonates, alkyl ammonium salts, alkyl trimethylammonium chlorides, branched alkyl ethoxylated alcohols, phenol-formaldehyde nonionic resin blends, cocobetaines, dioctyl sodium sulfosuccinates, imidazolines, alpha olefin sulfonates, linear alkyl ethoxylated alcohols, trialkyl benzylammonium chlorides, and mixtures thereof.

54. The method of claim 51 wherein the organic solvent further comprises a viscosifier.

55. The method of claim 54 wherein the viscosifier comprises an organophilic clay.

56. The method of claim 51 further comprising the step of derivatizing the polysaccharide in the slurry.

57. The method of claim 56 wherein the step of derivatizing the polysaccharide in the slurry occurs before the step of depolymerizing the polysaccharide in the slurry.

58. The method of claim 56 wherein the step of derivatizing the polysaccharide in the slurry occurs after the step of depolymerizing the polysaccharide in the slurry.

59. The method of claim 56 wherein the step of derivatizing the polysaccharide in the slurry occurs substantially simultaneously with the step of depolymerizing the polysaccharide in the slurry.

60. The method of claim 56 wherein the polysaccharide is derivatized with a derivatizing agent selected from the group consisting of alkylene oxides, haloacetic acids, alkali metal haloacetates, and mixtures thereof.

61. The method of claim 51 wherein the step of depolymerizing said polysaccharide comprises the addition of a peroxide to said organic solvent.

62. The method of claim 61 wherein the peroxide comprises hydrogen peroxide, an organic peroxide, or combinations thereof.

* * * * *